Patented May 24, 1949

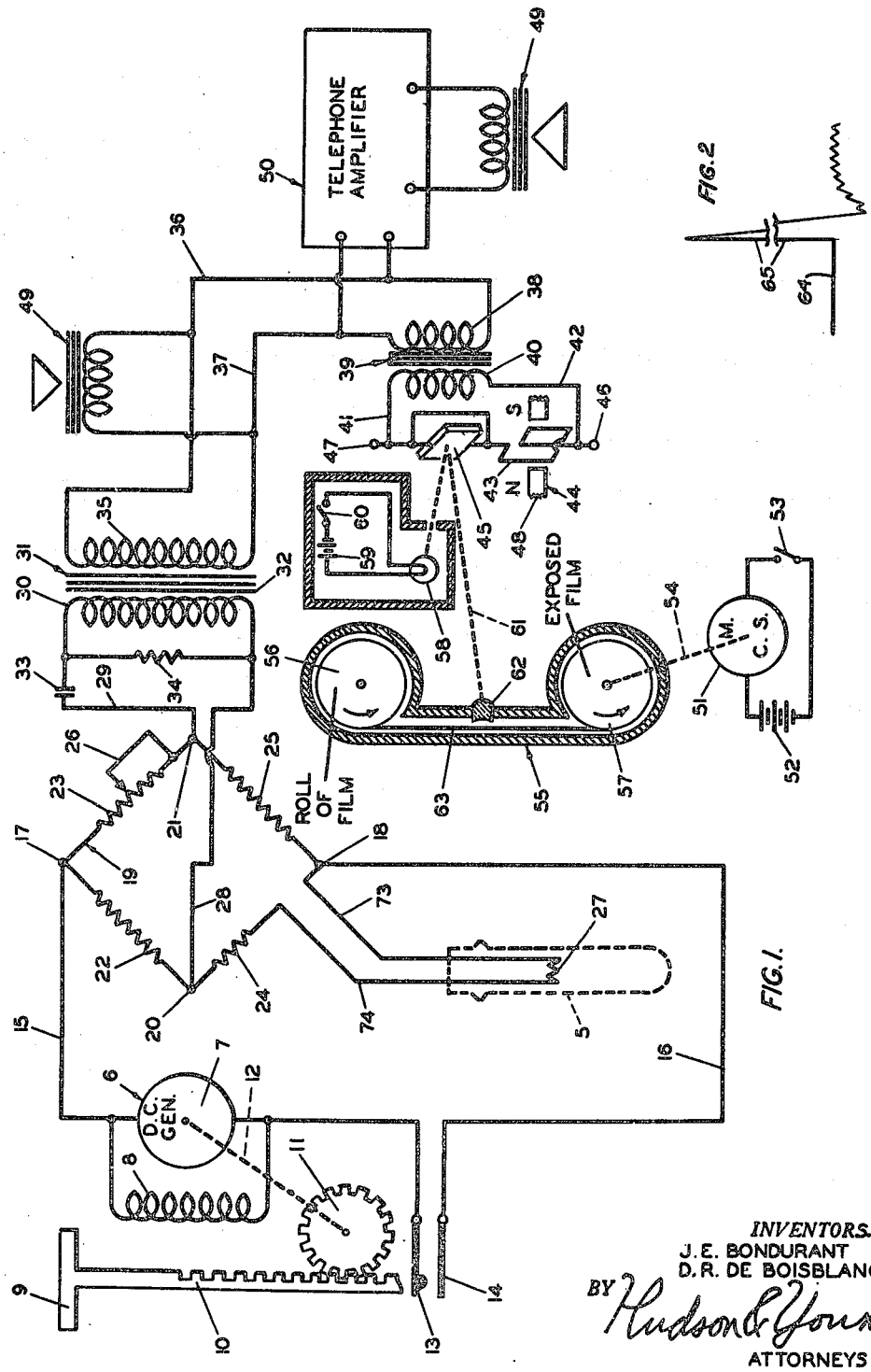

2,470,846

UNITED STATES PATENT OFFICE 2,470,846

SEISMOGRAPH BLASTER TIME BREAKER CIRCUIT

Deslonde R. de Boisblanc and John E. Bondurant, Bartlesville, Okla., assignors to Phillips Petroleum Company, a corporation of Delaware Application November 13, 1945, Serial No. 628,310

1 Claim. (Cl. 346—33)

This invention relates to electrical impulse generators. In a more specific aspect it relates to generators of time break impulses for recording on seismograph records. In another specific aspect it relates to means for forming such time break impulses so that they make an easily measured record.

In the art of seismic prospecting it is common to detonate a blasting charge and record the instant at which the charge was detonated (known as the time break) by means of a galvanometer. The same galvanometer and all the other galvanometers then record the seismic waves coming through the earth from the explosion on the same uniformly moving photographic film on which is recorded the time break of the blast. Knowing the speed of the film, measurements can be made on the film between the time break impulse and the record of the arrival of the seismic waves through the earth, whereby the time of travel of the waves is determined.

From these records geologists may theorize on the structure of the ground and such theorizing has become an accurate science so that oil formations and other valuable structures which are invisible from the surface may be readily located.

As the measurements made all start with the time break impulses as the zero point it is important that a good clear time break impulse be recorded from which measurements can accurately and easily be made.

In the prior art the current from the blasting machine was passed through a large inductance in a series with the heating element of the blasting cap. The build up of a current in the circuit was inhibited by this large inductance and the time break impulses gave a poor record. The weight of the large inductance is also objectional in portable blasting machines.

The principal object of the present invention is to make a substantial vertical time break impulse record as near to the type record illustrated in Figure 2 as possible, which record is free of any deviations until the very instant of detonation, and which record may be easily and accurately measured from.

Another object is to provide a blasting circuit connected with a time break recording circuit in which no current will flow in the time break recording circuit until the resistance in the blasting cap has been destroyed.

Another object is to provide in such a circuit means for forming a large electrical impulse in the time break recording circuit upon detonation of the blasting cap heating element.

Another object is to provide relatively light weight, simple and rugged electrical circuit equipment for the production of time break impulses which are to be recorded.

Numerous other objects and advantages will be apparent to those skilled in the art upon reading the accompanying specifications, claims and drawings.

In the drawings:

Figure 1 is a schematic and electrical diagram of a circuit embodying the present invention; and Figure 2 is a view of an actual time break record.

In Figure 1 the outline 5 of the blasting cap is shown. This blasting cap may be of any known electrical type, but in order to obtain the best results it is advisable to use a blasting cap especially made for seismograph services such as a Du Pont E-65"SSS" seismograph blasting cap. Such a cap when a current of approximately 5 amperes is applied will fire in less than 0.0004 of a second. However the present invention is valuable regardless of how special or ordinary blasting cap 5 may be.

Cap 5 is fired by a source of current such as a blasting machine generally designated as 6.

Other sources of current may be employed in place of 6 such as a battery, as will be explained later.

For best results it is preferred to use a direct current generating magneto type blasting machine 6 which is well known to the art. The magneto rotor 7 rotates in the field 8 and is generally hand driven, although it could be driven by motor. Several types of hand drivers are employed but for purposes of illustration the pump type is shown having a pump handle 9 with a rack 10 which rack on the down stroke engages and rotates gearing 11 which rotates rotor 7 through some type of shaft as 12. At the bottom of the stroke of pump handle 9 the handle closes a firing switch made up of contacts 13 and 14. Obviously the details of the direct current generator at point 6 do not effect the operation of the present invention which can use any type direct current source at 6.

When switch 13, 14 closes, current generated by 6 is applied through wires 15 and 16 to opposite points 17 and 18 of a bridge generally designated as 19. The bridge 19 consists of 4 points 17, 18, 20 and 21 connected as shown by resistances 22, 23, 24 and 25. Resistance 23 may be varied by variable shorting slider 26 or any other suitable means for varying resistance. Resistance 24 represents the resistance of several elements such as a fixed resistor, and the resistance of wires 73 and 74 but for purposes of clarity resistance 27 is shown separately as representing the resistance of the heating element in the blasting cap 5.

Connected from points 20 and 21 by wires 28 and 29 is the primary coil 30 of a transformer generally designated as 31. This transformer may or may not have an iron core 32 but better results are obtained with iron core 32.

A direct current is generated at 6, and in order to only record a pulse thereof it has been found advantageous to insert a condenser 33 in one of wires 28 or 29 and to bridge the primary 30 with a high resistance 34 in order to obtain the best results. However valuable results can still be obtained even if 33 and 34 are omitted and wires 28 and 29 are unbroken and unconnected except through bridge 19 and coil 30.

Transformer 31 has a secondary coil 35 which is connected by transmission line consisting of wires 36 and 37 to a primary coil 38 of a second transformer generally designated as 39. Transformer 39 has a secondary coil 40 which is connected by wires 41 and 42 to the coil 43 of a galvanometer generally designated as 44. Only one turn of coil 43 is shown for purpose of clarity. Coil 43 is rigidly connected to a mirror 45 and the mirror and galvanometer are suspended by pivots 46 and 47 for rotation in the field of permanent magnet 48 having north and south poles (N) and (S).

Obviously wires 28 and 29 could be connected directly to wires 41 and 42 if galvanometer 44 was made rugged enough. Obviously it is preferable to employ transformers 31 and 39 to obtain a proper current for galvanometer 44.

While a particular electrical circuit has been shown it is believed obvious that it may be modified in many ways without departing from the invention. For example if wires 36 and 37 run from the blasting point near generator 6 to the recording point near galvanometer 44 which points are often separated by a considerable distance it is convenient to use wires 36 and 37 for other purposes at the same time they form a part of the present invention. For example a telephone circuit consisting of a combination transmitter and receiver 49 may be installed on wires 36 and 37 with the usual telephone equipment generally designated as 50.

In Figure 1, parts 5 and 27 are down in a blasting hole (not shown) and parts 6 to 26 and 28 to 35 are ordinarily located at a point adjacent to the blasting hole while recording parts 38 to 48 may be a considerable distance away. The telephone instruments may be located wherever desired, ordinarily one near the blasting equipment and one near the recording equipment. The telephone equipment 50 is ordinarily placed near the recording equipment. The recording equipment which consists of all numbers over 38 and below 73 (except for 49 and 50) is generally located at a point distant from the blasting equipment. This location of parts may be varied but obviously nothing should normally be in the blast hole but 5, 27, 73 and 74. If the other parts are all close, telephones 49 and 50 may be removed. The location of parts therefore is a matter of convenience and does not change the invention. Obviously the man who operates pump handle 9 should be able to see the blast hole so he won't blow up somebody who might be dangerously near, but even that doesn't change the invention.

While many types of recording exist which can cooperate with mirror 45 of galvanometer 44 in order to present the present invention clearly a simplified form of such equipment has been shown to make the invention simpler. For example a constant speed motor 51 may be driven by any power source such as battery 52 when desired by closing switch 53. Motor 51 through shaft 54 drives a camera generally designated as 55 so that unexposed film on roll 56 is unrolled and rolled on roll 57 as indicated by arrows. A light source illustrated by incandescent bulb 58 is shown as powered by battery 59 and switch 60 and throws a ray of light 61 on to mirror 45 from which it is reflected to transparent lens 62 and concentrated on the film 63 lying behind 62 and traveling at a uniform speed from 56 to 57.

Actually the structure shown is quite a simplification as there may be as many as 12 galvanometers reflecting light from lamp 58 on to film 63. All the other galvanometers (not shown) and galvanometer 44 are also electrically connected to geophones (not shown) which geophones generate electrical currents when the earth that they are placed on, or in, vibrates with tremors from the blast set off by a blasting cap 5 which currents rotate the coils of the galvanometers and the mirrors recording the tremors on film 63 at a time later than the time break impulses.

It should be recognized that many other refinements may be added to the system shown in Figure 1 without departing from the present invention. For example it is not unusual to have a second source of light (not shown) which is interrupted by a slotted drum rotating at a very constant speed (not shown) so as to photograph time interval marking lines on film 63 through lens 62 at the same time that the galvanometers are photographing their respective traces on film 63. These time lines (not shown) may consist of a heavy line every 0.1 of a second and nine 0.01 second lines in between the heavy lines. Such an instrument which includes the present invention may be further improved by a device including a switch (not shown) on line 16 actuated by said drum which switch only closes every 0.1 of a second and is adjustably regulated that regardless of the time that the switch 13 and 14 closes, the blast will occur at such a time as to place the time break impulse exactly on a heavy line of the record, such a device to be the subject matter of a later filed application. However all these modifications and refinements still embody the present invention and in order to properly express the scope of the present invention the description has been limited to a relatively simple operative circuit with the express understanding that the circuit may be refined and made more complicated.

Figure 2 shows a galvanometer trace 64 as photographed on film 63 by light ray 61 varied in position by mirror 45. It will be noted that there is a sudden abrupt rise 65 in the trace when the time break occurs, and that measurements may be readily and accurately made from this line 65.

*Operation*

In order to explain the operation it will be necessary to assign values to the various resistances and condensers, but it should be understood that such values are merely for purposes of illustration and that many other suitable sets of values could be chosen without departing from the invention.

For illustrative purposes let resistance 22 be 10 ohms, 23 be 500 ohms, 24 be 10 ohms, 25 be 500 ohms and 27 be from 4 to 5 ohms depending on the length of the lead wires 73 and 74; which lead wires have a low resistance of about 1 ohm per 100 feet. With such a set up and using a Du Pont #30 cap blaster at 6 condenser 33 may be about 4 mfd. and resistance 34 may be about 250 ohms.

It will be noted that resistances 23 and 25 are much higher than resistances 22 or 24 and 27. Actually resistances 23 and 25 could be the same size or even smaller than resistance 22 and 24 plus 27 but in such case most of the current from 6 flowing from point 17 to point 18 would be wasted in resistance 23 and 25 where it would not accomplish anything. But by having resistance 23 and 25 high relative to 22, 24 and 27, most of the current will pass through resistance 27 where it will perform useful work in setting off blasting cap 5 until resistance 27 is destroyed.

The important feature of bridge 19 is that the resistances are balanced so that point 20 is at the same potential as point 21 as long as resistance 27 lasts. This is achieved by having the following ratio between the resistances:

$$\frac{R_1}{R_2+R_3}=\frac{R_4}{R_5}$$

(Where $R_1$ is resistance 22, $R_2$ is 24, $R_3$ is 27, $R_4$ is 23 and $R_5$ is 25.) In the example given the values would be:

$$\frac{10}{14.5}=\frac{X}{500}$$

$X=345$.

Variations in the length and therefore resistance of wires 73 and 74 may be compensated by varying resistance 23 with slider 26.

The object is to keep point 20 in the same potential as point 21 until resistance 27 is destroyed by the blast.

After conversation over telephones 49 at the time set for blasting cap 5 and the explosives to be fired, switch 60 is closed lighting 58 and switch 53 is closed starting the film 63. Trace 64 is then being photographed on the film. Handle 9 is pushed down rapidly and magneto 6 generates direct current. Handle 9 closes switch 13, 14 applying opposite voltage to point 17 and 18. Points 20 and 21 are always at the same potential so there is no current in primary 30. This state of firing lasts only about 0.0004 seconds if wire 27 sets blasting cap 5 off in that length of time.

Wire 27 is blown apart by the blast and becomes an infinite resistance which unbalances bridge 19 and a direct current pulse flows from point 20 to point 21 or vice versa loading up condenser 33 which puts a pulse into primary 30 inducing current in secondary 35 which direct current pulse is transmitted by wires 36 and 37 and applied through transformer 39 to coil 43 on galvanometer 44.

This sudden application of direct current pulse in coil 43 sets up a magnetic field opposing that of magnet 44 and causes the galvanometer mirror to jump making a substantially vertical line 65 in trace 64 as shown in Figure 2.

When there is a momentary rise in voltage just before the time break however the slider 26 should be moved to the right a bit to raise resistance 23. On the other hand when there is a momentary drop in voltage just before the time break resistance 23 should be decreased by moving slider 26 to the left. When the time break is properly adjusted for the right length of wires 73 and 74 the time break appears as in Figure 2. This adjustment can be made before the blast is made by setting of a test cap 5 with the right length wires before connecting a new cap 5 to the explosive.

Sometimes when the blast set off by cap 5 blows wires 73 and 74 out of the shot hole (not shown) bare portions of 73 and 74 may kiss a few times resulting in static or hash. The provision of means to eliminate this hash by breaking the circuit in wire 28 or 29, or preferably in wire 36 or 37 adjacent the galvanometer 44 a very short time after time break 12 occurs may be accomplished by electronic switching means not shown, as such means does not change the operation of the present invention but is merely a refinement which may be applied to the system along with the many other refinements already mentioned. However the static or hash if not removed occurs too late to do any damage to the time break and is merely overlooked in reading the record.

While the purpose of illustration we have shown a particular circuit provided for the present invention it is obvious that numerous changes and modifications may be made without departing from the scope of the present invention which is set forth in the following claim:

Having described our invention, we claim:

In apparatus for geophysical exploration, a circuit for recording the time break which comprises, in combination, a Wheatstone bridge circuit of the resistance type, one arm of said bridge including the heating element of an electrical blasting cap, and a resistor in series with said blasting cap, the ohmic value of said resistor being greater than the ohmic value of said blasting cap, a transformer having its primary winding connected across two opposite corners of the bridge, a generator connected across the other opposite corners of the bridge, means for actuating said generator to pass an electric current through said blasting cap for initiating an explosion in an attached charge which causes disintegration of said heating element, thereby opening said one arm of the bridge circuit, and a differentiating circuit for receiving and sharpening the pulse produced by the opening of said arm of the bridge circuit, said transformer transmitting the sharpened pulse to a recording mechanism to record the pulse.

D. R. DE BOISBLANC.
J. E. BONDURANT.

REFERENCES CITED

The following references are of record in the file of this patent:

UNITED STATES PATENTS

| Number | Name | Date |
|---|---|---|
| 605,548 | Jaeger | June 14, 1898 |
| 1,044,798 | McCarty | Nov. 19, 1912 |
| 1,898,209 | Parker | Feb. 21, 1933 |
| 1,906,105 | Sandison | Apr. 25, 1933 |
| 1,951,461 | Wilson | Mar. 20, 1934 |
| 2,144,216 | Broome | Jan. 17, 1939 |
| 2,275,316 | Ritzmann | Mar. 3, 1942 |
| 2,292,159 | Richardson | Aug. 4, 1942 |
| 2,331,623 | Parr, Jr. | Oct. 12, 1943 |
| 2,400,571 | Olesen | May 21, 1946 |
| 2,413,020 | Wolfner, 2d | Dec. 24, 1946 |

FOREIGN PATENTS

| Number | Country | Date |
|---|---|---|
| 507,667 | France | July 1, 1920 |